No. 885,314. PATENTED APR. 21, 1908.
C. M. BAREKMAN.
SORGHUM STRIPPER.
APPLICATION FILED AUG. 7, 1906.
2 SHEETS—SHEET 1.
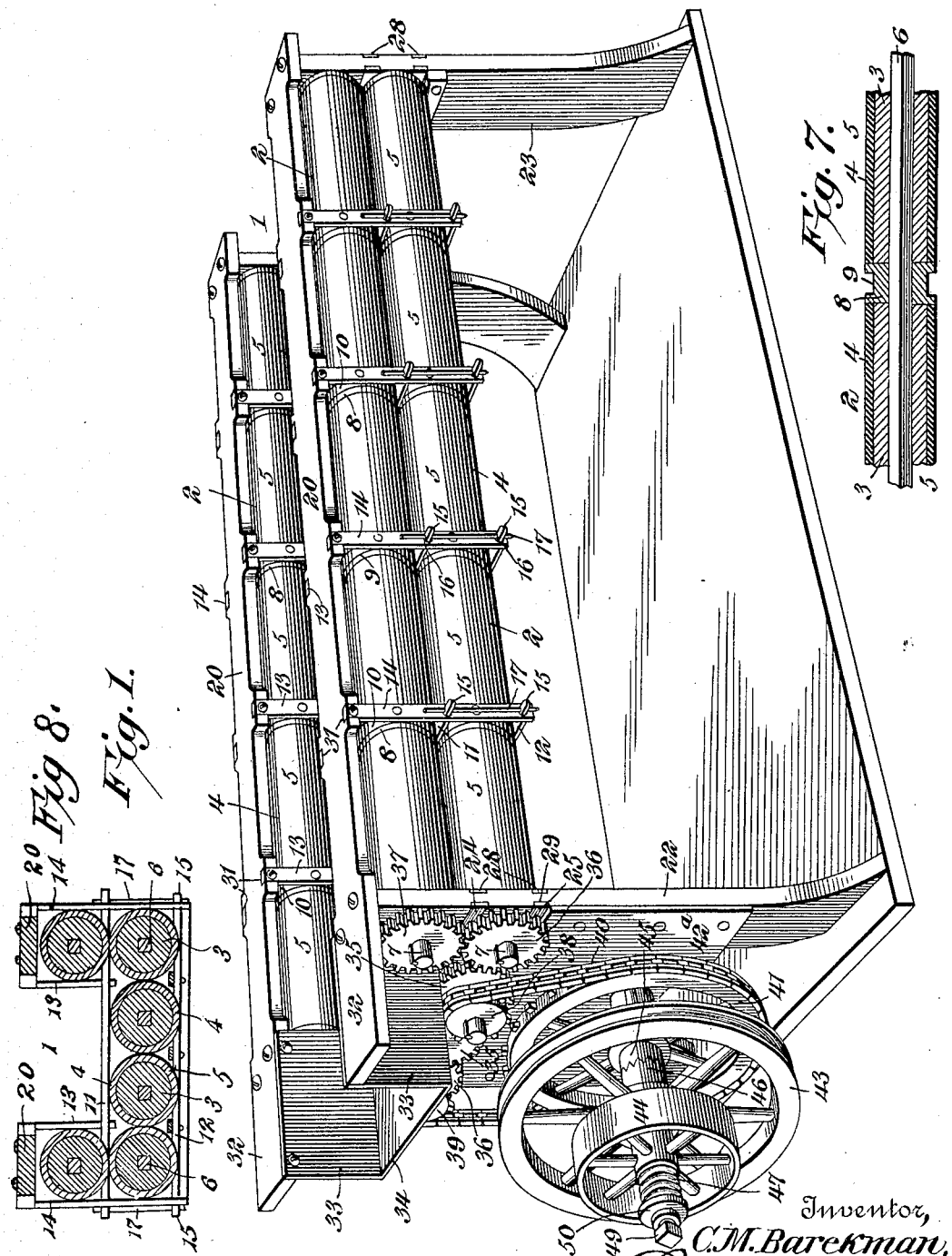

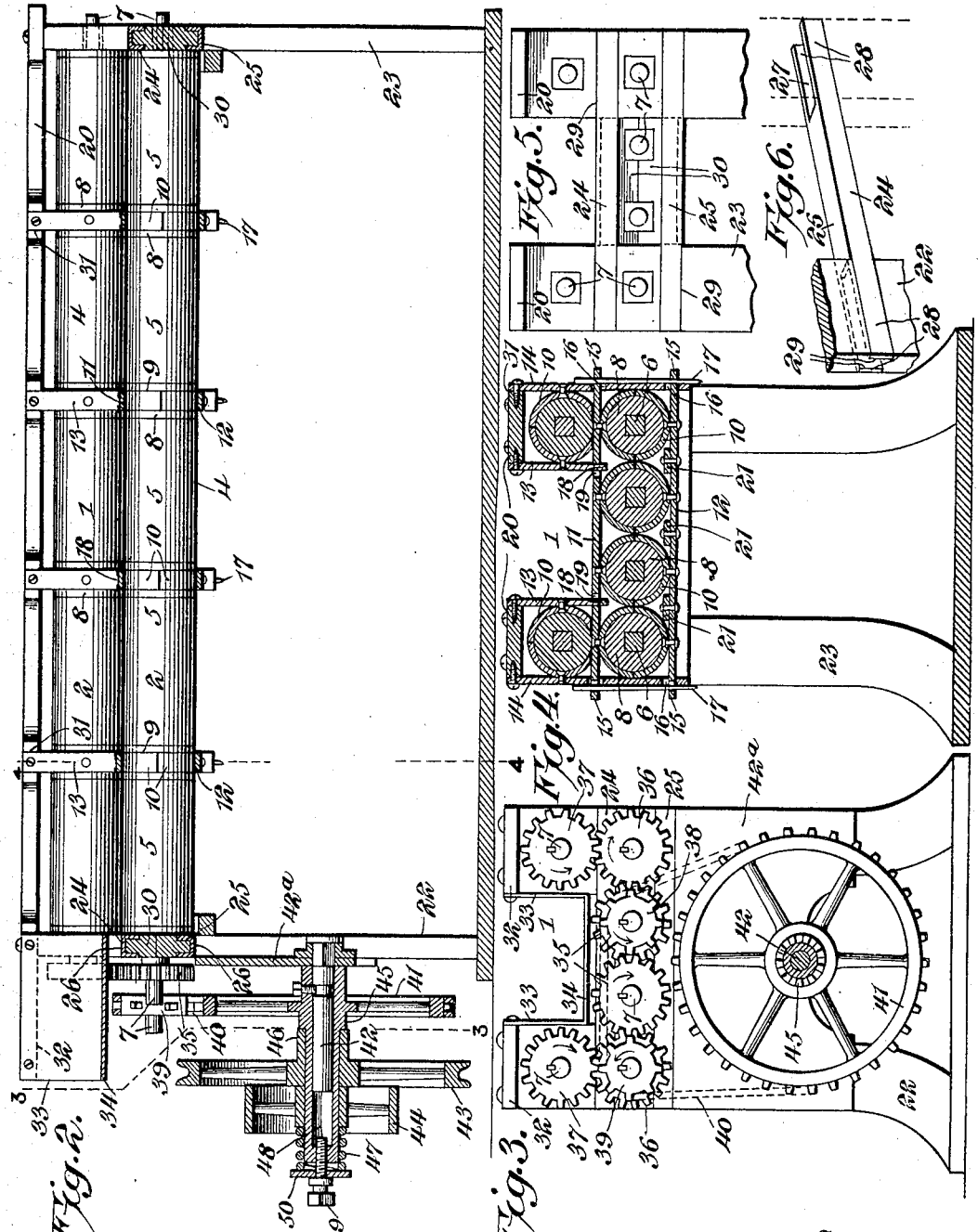

UNITED STATES PATENT OFFICE.

CURREN M. BAREKMAN, OF VINCENNES, INDIANA.

SORGHUM-STRIPPER.

No. 885,314.  Specification of Letters Patent.  Patented April 21, 1908.

Application filed August 7, 1906. Serial No. 329,527.

*To all whom it may concern:*

Be it known that I, CURREN M. BAREKMAN, a citizen of the United States, residing at Vincennes, in the county of Knox and State of Indiana, have invented a new and useful Sorghum-Stripper, of which the following is a specification.

The invention relates to a sorghum stripper.

The object of the present invention is to improve the construction of sorghum stripping machines, and to provide a simple and comparatively inexpensive machine of this character, capable of rapidly stripping the blades from sorghum cane by means of rolls without permitting the cane to be drawn between and crushed by the said rolls.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings—Figure 1 is a perspective view of a sorghum stripper, constructed in accordance with this invention. Fig. 2 is a central longitudinal sectional view. Fig. 3 is a transverse sectional view on the line 3—3 of Fig. 2. Fig. 4 is a similar view on the line 4—4 of Fig. 2. Fig. 5 is a rear elevation of the upper portion of the machine. Fig. 6 is a detail perspective view partly in section, illustrating the construction of the main frame. Fig. 7 is a detail sectional view, illustrating the construction of the stripping rolls. Fig. 8 is a transverse sectional view, illustrating the arrangement of the rolls, which form the cane-receiving trough or receptacle.

Like numerals of reference designate corresponding parts in all the figures of the drawings.

The sorghum stripping machine is provided with a longitudinal trough or receptacle for the sorghum cane, which is placed in the chamber or compartment 1 of the said trough or receptacle. This trough or receptacle is composed of stripping rolls 2, forming the bottom and side walls of the trough or receptacle, and adapted to engage and strip the blades of sorghum from the stalks, which are prevented by the bearings or supports of the stripping rolls from being drawn between and crushed by the latter. The stripping rolls, which are of greater diameter than the stalks, are arranged horizontally to form the bottom of the trough or receptacle, and are disposed in a vertical plane to provide the opposite side walls, and while this form of trough or receptacle is most effective, yet it will be readily apparent that other forms may be employed, if desired.

The stripping rolls, which may be constructed of any suitable material, preferably consist of a wooden body portion 3, and a sleeve or covering 4 of rubber, and they are composed of short sections 5 and are mounted on shafts 6. The shafts, which have terminal bearing portions or gudgeons 7, are squared, and fit in rectangular bores or openings of the stripping rolls, and the said shafts also receive metallic bearing sleeves or collars 8, having annular bearing grooves 9, which fit in bearing rings 10 of the transverse supports of the main frame.

The intermediate transverse supports, which are arranged at short intervals, are adapted to prevent the cane from being drawn between and crushed by the stripping rolls, and are composed of upper and lower horizontal bars or members 11 and 12 and inner and outer vertical bars or members 13 and 14. The bearing rings are riveted to the bars or members of the transverse supports, and the horizontal bars or members are provided at their terminals with projecting tongues 15, which extend through slots or openings 16 of the outer or vertical bars or members 14, and which are engaged by vertical pins or keys 17, as clearly illustrated in Fig. 4 of the drawings. The vertical pins or keys pierce the projecting tongues 15, and engage the outer face of the vertical bars or members 14. The inner vertical bars or members 13 are provided at their lower ends with projecting tongues 18, which fit in slots or openings 19 of the upper horizontal bars or members 11. The upper end of the inner and outer vertical bars or members 13 and 14 are secured to the sides of the horizontal side bars 20 of the main frame of the machine.

The sorghum is placed within the compartment or chamber 1 of the trough or receptacle of the machine, and upon the upper horizontal bars or members 11, which prevent the cane from being injured by the stripping rolls. The stripping rolls are adapted to engage the blades, which are drawn downward from the stalks, and in order to prevent a blade from wrapping around the stripping rolls, longitudinal bars 21 are provided. The longitudinal bars 21 are supported by the lower horizontal bars or members 12 of the transverse supports, and are arranged beneath the contiguous portions of the rolls, as clearly illustrated in Fig. 4 of the drawings. The side edges of the longitudinal bars 21 are arranged close to the stripping rolls, so as to scale the blades from the rolls, and cause the said blades to drop downward through the machine. The contiguous portions of the pair of bottom rolls move downwardly in the direction of the arrow in Fig. 3, and the contiguous portions of each pair of side rolls move outwardly, the outwardly moving portions of the rolls being adapted to strip the blades from the stalks. The rotation of the rolls also operates to turn the cane, so that all of the blades thereof will be removed by the rolls.

The main frame is provided with corner standards 22 and 23, which are connected by upper and lower transverse bars or members 24 and 25, see Fig. 5, arranged at the front and rear ends of the machine, and composed of side flanges and a connecting web or portion 26, which terminates short of the ends of the side flanges to provide end slots or openings 27, to receive the standards 22 and 23 and to form projecting arms 28 for embracing the standards. The standards are provided with grooves or recesses 29 to receive the arms of the transverse bars or members 24 and 25. The grooves, formed by the side flanges and the connecting webs of the bars or members 24 and 25, receive sectional bearings 30, and the latter have bearing openings for the journals or gudgeons of the central bottom rolls, and are interposed between the standards, which extend above the bars or members 24 and 25, and which are provided with suitable bearings for the journals or gudgeons of the side rolls. The standards are also connected at their upper ends by the longitudinal side bars 20, which are provided at their inner and outer edges with projecting portions, having recesses 31 to receive the upper terminals of the inner and outer vertical bars or members of the transverse supports. The longitudinal side bars 20 are also provided with front extensions 32 to the inner edges of which are secured the sides 33 of a substantially U-shaped guide 34. The U-shaped guide 34, which is composed of vertical sides and a connecting horizontal portion, enables the cane to be conveniently run into the machine without coming in contact with the gearing, hereinafter described, for operating the rolls.

The central bottom rolls are provided at their front ends with pinions 35, which mesh with each other and with lower side pinions 36. The lower side pinions 36 mesh with upper side pinions 37, and all of the said pinions are keyed to the shafts, or otherwise connected with the stripping rolls. The contiguous portions of the pinions 35 move downwardly in the direction of the arrows in Fig. 3 of the drawings, and the contiguous portions of the lower and upper side pinions 36 and 37 move outwardly in the direction of the arrows in Fig. 3. The right hand central roll and the left hand side roll are provided with pinions 38 and 39, which mesh with a sprocket chain 40, and the latter is also arranged on a sprocket wheel 41. The sprocket wheel 41 is mounted on a stub shaft 42, which is suitably connected with the front portion of the main frame, preferably by means of a plate or member 42ª. The sprocket wheel 41 is connected with drive pulleys 43 and 44 by means of clutch sections or members 45 and 46, which are yieldably held in engagement with each other by means of a coiled spring 47, disposed on a tubular extension 48 of the sprocket wheel and engaging the adjacent pulley 44. The clutch sections are provided with tapering teeth, having opposite angularly disposed faces, and the tension of the spring is controlled by an adjusting screw 49, carrying the washer 5 for engaging the outer end of the spring. Should any hard substance get between and choke or clog the stripping rolls, the clutch will permit the pulleys to rotate without operating the machine. The pulleys may be connected with any suitable motor or driving mechanism.

Having thus fully described my invention, what I claim as new and desire to secure by Letters Patent, is:—

1. A cane stripping machine composed of a horizontal series of rolls, and a vertically alined side roll at each end of the series, said rolls defining a trough or receptacle, the side walls and bottom of which are formed by said rolls and all of the rolls being in rolling contact, the top of the receptacle being open to allow for feeding the cane to the machine.

2. A cane stripping machine composed of a horizontal series of rolls, and a vertically alined side roll at each end of the series, said rolls defining an open top trough or receptacle, the side and bottom walls of which are formed by the said rolls and the latter being of greater diameter than the stalks.

3. A cane stripping machine provided with a trough or receptacle composed of stripping rolls, and cane-supporting means arranged at intervals throughout the trough beyond the peripheries of the rolls to prevent the cane from being crushed by the rolls, said cane-supporting means also serving to support the stripping rolls.

4. A cane stripping machine composed of a horizontal series of rolls, and a vertically alined side roll at each end of the series, said rolls defining an open top trough, the side walls and bottom of which are formed by the said rolls, and intermediate transverse supports located at intervals throughout the trough and connecting the side and bottom rolls and arranged to prevent the cane from being crushed by the said rolls.

5. A cane stripping machine provided with a cane-receiving trough or receptacle composed of stripping rolls, and transverse supports arranged at intervals throughout the trough and projecting beyond the peripheries of the rolls and adapted to prevent the cane from being crushed by the rolls, and provided with rings forming bearings for the rolls.

6. A cane stripping machine provided with a cane-receiving trough or receptacle composed of stripping rolls, and transverse supports adapted to prevent the cane from being crushed by the rolls and composed of spaced horizontal and vertical bars or members, and bearing rings interposed between the said bars or members and receiving the rolls.

7. A cane stripping machine provided with a cane-receiving trough or receptacle composed of stripping rolls, and transverse supports adapted to prevent the cane from being crushed by the rolls and composed of upper and lower horizontal bars or members having terminal tongues, the upper bars or members being also provided with openings, inner and outer vertical bars or members, the outer vertical bars or members having openings to receive the said tongues, and the inner vertical bars or members being provided with tongues for engaging the openings of the upper horizontal bars or members, and fastening means for engaging the tongues of the horizontal bars or members.

8. A cane stripping machine comprising a main frame having side bars, transverse supports hung from the side bars, and stripping rolls mounted in the frame and in the supports and forming a cane-receiving trough or receptacle, the rolls being made in sections and extending between the supports.

9. A cane stripping machine comprising a main frame having side bars, transverse supports hung from the side bars, and stripping rolls made in sections and mounted in the frame and in the supports and forming a cane-receiving trough or receptacle, said supports being provided at the junction of the sections with means for preventing the cane from being crushed by the rolls.

10. A cane stripping machine comprising standards, transverse bars or members connecting the standards and composed of side flanges and connecting webs and provided with grooves, said side flanges being extended beyond the connecting webs to form arms, which embrace the standards, bearings mounted in the grooves of the transverse bars or members and interposed between the standards, and rolls mounted in the said bearings.

11. A cane stripping machine provided with a cane-receiving trough or receptacle composed of stripping rolls, cane supporting means for preventing the cane from being crushed by the rolls, and means carried by the cane-supporting means for preventing the blades of the cane from wrapping around the rolls.

12. A cane stripping machine provided with a cane-receiving trough or receptacle composed of stripping rolls, transverse supports for preventing the cane from being crushed by the rolls, and longitudinal bars carried by the supports and arranged to prevent the blades of the cane from wrapping around the rolls.

13. In a cane stripping machine, the combination of transverse supports arranged at intervals, stripping rolls composed of sections arranged between the supports forming a cane-receiving trough having a bottom and side walls, and shafts connecting the sections of the stripping rolls.

14. In a cane stripping machine, the combination with transverse supports arranged at intervals and having bearing rings, stripping rolls composed of sections located between the transverse supports, shafts on which the said sections are mounted, and sleeves or collars carried by the shafts and interposed between the said sections, said sleeves or collars being mounted in the bearing ring of the transverse supports.

15. In a cane stripping machine, the combination of sectional rolls arranged in the form of a trough, and means located at the junction of the sections of the rolls for connecting the latter, the sides and bottom of the trough being made up of moving faces of the rolls and the said connecting means projecting beyond the peripheries of the rolls to form supports for the cane.

16. In a cane stripping machine, the combination of a cane-receiving trough or receptacle composed of sectional stripping rolls, and means located at the junction of the sections of the rolls and thereby spaced apart throughout the length of the trough said means projecting beyond the peripheries of the rolls to support the cane and prevent the same from being drawn between and crushed by the rolls.

In testimony, that I claim the foregoing as my own, I have hereto affixed my signature in the presence of two witnesses.

CURREN M. BAREKMAN.

Witnesses:
  JAMES M. HOUSE,
  BENJAMIN M. WILLOUGHBY.